Dec. 9, 1930.  H. BROOKE  1,784,332
LIQUID ELECTRIC CONTROLLER
Filed Jan. 31, 1928    2 Sheets-Sheet 1

INVENTOR:
HERBERT BROOKE,

ATTORNEYS

Dec. 9, 1930. H. BROOKE 1,784,332
LIQUID ELECTRIC CONTROLLER
Filed Jan. 31, 1928 2 Sheets-Sheet 2

INVENTOR:
HERBERT BROOKE,

ATTORNEYS.

Patented Dec. 9, 1930

1,784,332

UNITED STATES PATENT OFFICE

HERBERT BROOKE, OF BRIGHTON, ENGLAND

LIQUID ELECTRIC CONTROLLER

Application filed January 31, 1928, Serial No. 250,914, and in Great Britain March 3, 1927.

This invention relates to liquid electric controllers of the moving electrode type and has for its object to provide a controller of this type having an increased range of resistance.

In this type of controller it is usual to provide a cylindrical or square pipe of insulating material with insulated fixed electrodes forming a cover at one end. The electrolyte in this pipe forms a resistance in the rotor circuit of the motor to be controlled.

The present invention comprises a liquid electric controller wherein means are provided for varying the depth of submersion of the electrodes simultaneous with varying their distance apart.

The electrodes may be of the kind which have no vertical movement and the depth of submersion of them in the electrolyte may be varied by means of a vertically movable weir. In the preferred form of the apparatus one electrode is fixed and the other movable to and from it by mechanism operatively connected to mechanism for moving a depth controlling weir in the vessel containing the electrolyte. Both of the electrodes may be movable and means provided whereby each can be moved to and from the other and with the whole or a portion of this movement effected simultaneously with that of the weir.

Figure 1:
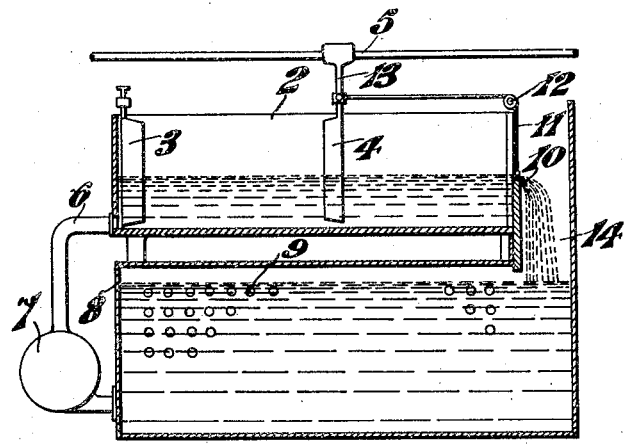
Figure 2:
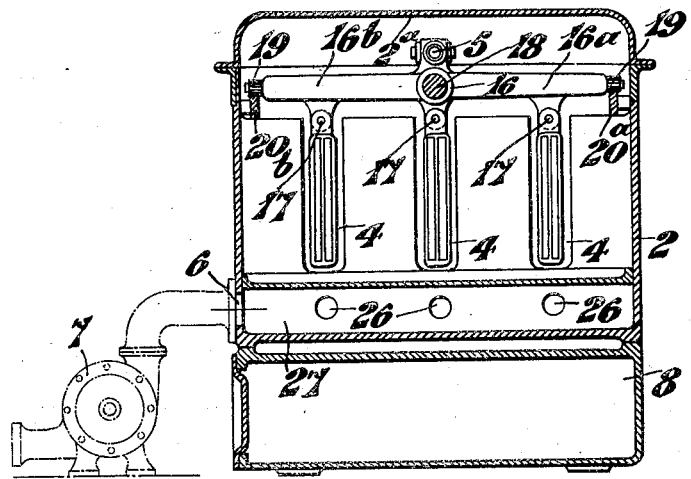
Figure 4:
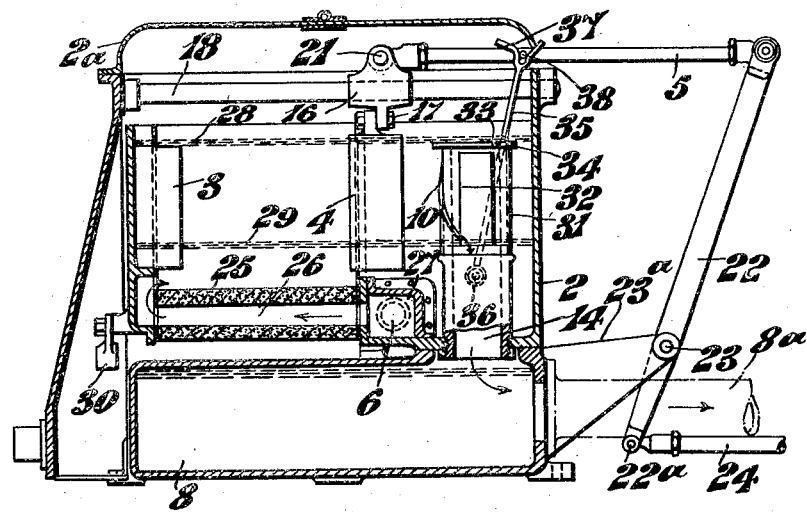
Figure 3:
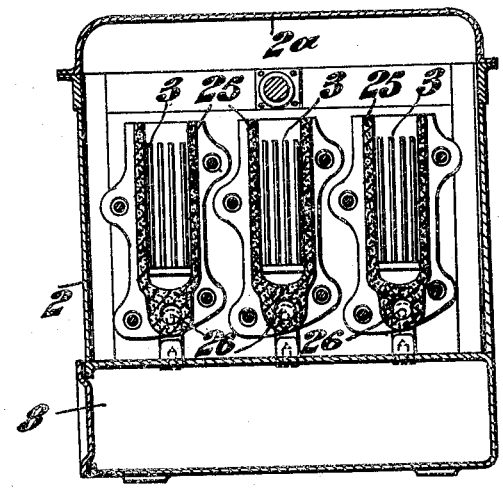

Two methods of carrying out the invention are illustrated diagrammatically by the accompanying drawings, Figure 1 being a general sectional view of one method, while Figures 2, 3 and 4 are sectional transverse and longitudinal elevations of the second method. Figure 2 is a transverse view showing the moving electrodes while Figure 3 is a similar view showing the fixed electrodes.

In these drawings 2 is a trough containing a suitable electrolyte, 3 is a fixed electrode or group of fixed electrodes fixed at one end of the trough 2, and 4 a movable electrode or group thereof movable along the trough 2 to and from the fixed electrode 3 by an operating rod 5 which also holds the movable electrode the desired depth in the trough 2.

In Figure 1 the trough 2 is of the usual type provided with an inlet 6 connected to a circulating pump 7 drawing the electrolyte from a cooling reservoir 8 containing a system of tubes 9 through which a cooling medium may be circulated in any suitable or known manner. The pump 7 is kept working in such a manner as to maintain the level of the electrolyte at the height of the weir whatever its position may be. At the end of the trough 2 opposite the fixed electrode is provided a vertically movable weir 10 which discharges electrolyte down an outlet 14 leading to the cooling reservoir 8.

The electrolyte trough 2 or the base or supports thereof is or are made of porcelain or other suitable insulating material.

The vertically movable weir 10 is supported by a rope or flexible member 11 which passes over a guide pulley 12 and is connected to the supporting member 13 of the movable electrode 4.

Any suitable means are provided for operating the rod 5, also suitable means are provided for connecting the electrodes to the electric leads of the motor or system to be controlled.

Multiplying mechanism may be provided for giving the desired relative movements of the weir 10 and electrode 4, or the mechanism may be so arranged that a portion of the movement of the electrode 4 may be effected without operating the weir 10 the remainder of its movement being effected simultaneously with the movement of the weir 10.

In Figures 2, 3 and 4 the corresponding portions are given the same reference numerals as in Figure 1, the trough 2 is provided with a cover 2a and with an outlet 14.

As in the previous example the outlet 14 discharges into a reservoir 8 provided with an outlet 8a. The movable electrodes 4 are suspended from a slide 16 by means of bolts 17. The slide 16 is supported on a central rod 18 fixed at its opposite ends in the walls of the tank 2, and is also provided with oppositely disposed arms 16a and 16b provided at their ends with rollers 19 running on rails 20a, 20b.

The slide 16 is connected by a pin 21, and rod 5 to the upper end of a lever 22 pivoted at 23 to a bracket 23a extending from the reservoir 8, the lower end of the lever 22 being connected by a pin 22a to a controlling or operating rod 24.

The fixed electrodes 3 are supported in troughs 25 of insulating material each provided with a passage 26 open at one end to the electrolyte trough and communicating at the other with passage 27 leading to the electrolyte inlet 6.

The maximum level of the electrolyte is indicated at 28 and the minimum level at 29. The leads of the rotor or other device under control are connected to the fixed electrodes by a terminal 30.

The weir 10 in the present example is in the form of a helical edge formed on a tube extending upwards from the outlet 14 and is covered by a rotary sleeve 31 having a rectangular opening 32 and adapted to be rotated by two pins 33 and 34 extending from its upper edge and engaging opposite sides of a lever 35 pivoted at 36 and having at its upper end a fork 37 engaging a pin 38 extending laterally from the rod 5.

The operation is as follows: When the moving electrode is moved along the rod 18 by the lever 22 by the rod 24, pin 38 effects a corresponding movement of the lever 35 and the sleeve 31 is rotated to move the opening 32 to a corresponding position up or down the inclined weir 10 to ensure the level of the electrolyte in the trough 2, being that required for the adjusted distance between the fixed and movable electrodes.

By means of either of these devices in the sequence of operations the electrode could be started to move and the weir started to rise with a very small section of the electrolyte and of the electrode in circuit, and the depth of the electrolyte caused to increase gradually until the trough was full, so that when the electrode has moved to say half its travel the remaining half of the stroke could be used to start up a motor under the heaviest load conditions by bringing the moving electrode into mesh with the fixed electrode.

For use with three phase systems the apparatus may consist of three troughs or electrode chambers open at the top, and in which are mounted three moving electrodes joined together as a neutral point and vertically suspended from rails above the trough. The electrolyte may be pumped into the three troughs simultaneously at the low level, and vertically movable weir devices provided whereby the level of the electrolyte can be gradually raised. This apparatus is extremely simple to construct and meets all the requirements of a three phase winder service, such requirements not having been fully met heretofore in this type of controller, so that it was impossible to obtain sufficient range to obtain the minimum current required at the beginning of the stroke up against the maximum current with the electrodes sufficiently far apart. It is thus possible by means of the present invention to construct a controller for a given range of resistance, wherein the stroke of the electrode will be very much less than in an ordinary type of controller constructed for the same range of resistance.

What I claim and desire to secure by Letters Patent is:—

1. A liquid electric controller comprising a through containing an electrolyte, a fixed electrode, a horizontally moving electrode, means for effecting the horizontal movement of the moving electrode, a vertically moving weir provided in the trough and means for effecting the vertical movement of the weir, the said horizontal and vertical movements being mechanically coupled together to move the movable electrode away from the fixed electrode at the same time that the weir is lowered to vary the extent of immersion of both electrodes.

2. A liquid electric controller comprising a trough containing an electrolyte, a horizontally movable slide, a movable electrode connected to the said slide, a horizontally movable operating rod also connected to the said slide, a carrying rod for the slide fixed to the trough, a fixed electrode, a vertically moving weir provided in the trough, and means for moving the weir vertically, the slide carrying rod being fixed horizontally in the trough above the electrolyte so that the slide can move thereon horizontally, both the slide and the means for moving the weir vertically being mechanically coupled to the operating rod so as to be operated thereby simultaneously.

3. A liquid electric controller comprising an electrolyte containing trough, a horizontally moving slide, a movable electrode connected to said slide, an operating rod connecting to said slide, a carrying rod for the slide fixed to the trough, a fixed electrode, a vertically moving weir provided in the trough, a weir raising lever pivoted to the trough, the operating rod being mechanically coupled to both the horizontally moving slide carrying the movable electrode and to the weir raising lever.

4. A liquid electric controller, comprising an electrolyte containing trough, a horizontally moving electrode, a fixed electrode, an overflow tube extending through the base of the trough and provided at its top with a rotatable upper portion, a tube rotating lever pivoted to the trough, and an operating rod, the fixed portion of the overflow tube being provided with an inclined upper edge, and a rotatable portion with a side opening extending across the upper edge, the operating rod being mechanically coupled to both the horizontally moving electrode and the tube rotating lever.

5. In an electric controller, the combination with an electrolyte containing tank of an electrode in fixed relation with said tank; a second electrode mounted for longitudinal movement relative to said tank; and means adapted to regulate the depth of electrolyte in said tank and operated by the movement of said movable electrode; and means for supplying the electrolyte to said tank.

In witness whereof I affix my signature.

HERBERT BROOKE.